US012771119B2

(12) United States Patent
Prignitz

(10) Patent No.: US 12,771,119 B2
(45) Date of Patent: Oct. 20, 2026

(54) METHOD FOR CONTROLLING A CONVERTER, APPARATUS AND SYSTEM

(71) Applicant: Nordex Energy SE & Co. KG, Hamburg (DE)

(72) Inventor: Cord Prignitz, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 18/638,422

(22) Filed: Apr. 17, 2024

(65) Prior Publication Data

US 2024/0356327 A1 Oct. 24, 2024

(30) Foreign Application Priority Data

Apr. 24, 2023 (EP) .................................... 23169485

(51) Int. Cl.
*H02H 7/06* (2006.01)
*H02M 5/458* (2006.01)
*H02P 9/00* (2006.01)

(52) U.S. Cl.
CPC .............. *H02H 7/06* (2013.01); *H02M 5/458* (2013.01); *H02P 9/007* (2013.01)

(58) Field of Classification Search
CPC ........... H02H 7/06; H02M 5/458; H02P 9/007
See application file for complete search history.

(56) References Cited

U.S. PATENT DOCUMENTS 8,390,139 B2 3/2013 Fortmann
2010/0320762 A1 12/2010 Letas et al.
2010/0327584 A1 12/2010 Fortmann
2011/0163546 A1* 7/2011 Gupta .................. F03D 7/0284 290/44
2013/0193933 A1* 8/2013 Andresen .................. H02P 9/02 322/23

(Continued)

FOREIGN PATENT DOCUMENTS

EP 2 245 728 B1 8/2017
EP 3 518 368 A1 7/2019

(Continued)

OTHER PUBLICATIONS

Extended Search Report of the European Patent Office dated Oct. 6, 2023 in European patent application 23169485.2 on which the claim of priority is based.

*Primary Examiner* — Sean Gugger
(74) *Attorney, Agent, or Firm* — Walter Ottesen, P.A.

(57) ABSTRACT

Methods for controlling a converter and corresponding apparatus and system are provided. The converter is configured to be connected to a rotor of a doubly-fed induction generator for feeding electrical power into an electrical grid, the converter having a machine-side inverter, a grid-side inverter, and a DC voltage intermediate circuit including a protection element for dissipating power from the DC voltage intermediate circuit. The method includes obtaining information representative of power supplied by the generator to the electrical grid exceeding a target power value beyond a predetermined threshold; and controlling the converter, in response to obtaining the information, such that the grid-side inverter supplies power to the protection element so as to dissipate power from the DC voltage intermediate circuit.

14 Claims, 6 Drawing Sheets

(56) References Cited

U.S. PATENT DOCUMENTS

| | | | | |
|---|---|---|---|---|
| 2014/0138949 | A1* | 5/2014 | El Moursi | H02P 9/007 290/44 |
| 2015/0188468 | A1 | 7/2015 | Xu et al. | |
| 2019/0234378 | A1 | 8/2019 | Tan et al. | |

FOREIGN PATENT DOCUMENTS

| | | | |
|---|---|---|---|
| EP | 2 873 151 | B1 | 8/2021 |
| WO | 2009103504 | A2 | 8/2009 |
| WO | 2009103505 | A2 | 8/2009 |
| WO | 2014008647 | A1 | 1/2014 |

* cited by examiner

METHOD FOR CONTROLLING A CONVERTER, APPARATUS AND SYSTEM

CROSS-REFERENCE TO RELATED APPLICATIONS

This application claims priority of European patent application no. 23169485.2, filed Apr. 24, 2023, the entire content of which is incorporated herein by reference.

TECHNICAL FIELD

The following description relates generally to controlling the operation of a converter, a corresponding apparatus and system, and particularly to converters for doubly-fed induction generators (DFIGs) as commonly used with wind turbines.

BACKGROUND

DFIG systems include a wound-rotor asynchronous generator and commonly a back-to-back converter including a machine-side inverter, a grid-side inverter, and a DC voltage intermediate circuit connecting both inverters. Commonly the rotor of the generator is connected to the converter and the stator of the asynchronous generator is connected directly to the AC grid. Thus, mechanical drive train components of a wind turbine sustain mechanical stress during grid faults due to oscillations caused by the jump in the grid voltage. This mechanical stress can be limited by applying maximum electrical torque from the generator. The maximum electrical torque, however, is limited by the maximum active power that can be fed into the grid by the DFIG system.

For a reliable operation of a wind turbine, it is desirable to be able to control the wind turbine even at weak grid connection points and in the event of a grid fault.

SUMMARY

It is an object to provide a method for controlling a converter, a corresponding apparatus and system that contribute(s) to a reliable operation of a wind turbine in particular at weak grid connection points and in the event of a grid fault.

According to a first aspect, a method for controlling a converter is specified. The converter is configured to be connected to a rotor of a DFIG, for feeding electrical power into an electrical grid. The converter includes a machine-side inverter, a grid-side inverter, and a DC voltage intermediate circuit.

The DC voltage intermediate circuit contains a protection element for dissipating power from the DC voltage intermediate circuit.

The method includes the steps of:

(1) obtaining information representative of power supplied by the generator to the electrical grid exceeding a target power value beyond a predetermined threshold; and (2) controlling, in response to obtaining the information, the converter such that the grid-side inverter supplies power to the protection element so as to dissipate power from the DC voltage intermediate circuit.

Using the grid-side inverter to "draw" active power from the grid-side AC bus to the DC voltage intermediate circuit and particularly towards the protection element enables a larger capacity of power dissipation for DFIG wind turbines. Compared to conventional control strategies, a limitation of the capacity due to a maximum current carrying capacity of the machine-side inverter is overcome. In particular, in case that both the grid-side inverter and the machine-side inverter are used to divert power to the protection element and have approximately the same current carrying capacity, the capacity of power dissipation for DFIG wind turbines may effectively be doubled.

DFIG wind turbines with a converter employing the above defined method may thus be particularly used on weak grids, that is, grids that are limited as to the amount of power that can be fed to the grid by the DFIG. In other words, such DFIG wind turbines may be used at weak grid connection points.

In an embodiment according to the first aspect, the machine-side inverter is coupled to the grid-side inverter through the DC voltage intermediate circuit. The DC voltage intermediate circuit may also be referred to as "DC link". The protection element is coupled to a positive DC bus and a negative DC bus of the DC voltage intermediate circuit.

In an embodiment according to the first aspect, the machine-side inverter is configured to be coupled to a machine-side AC bus transmitting three-phase electric power to and from the rotor of the DFIG. The grid-side inverter is configured to be coupled to a grid-side AC bus transmitting three-phase electric power to and from the grid.

In an embodiment according to the first aspect, the protection element includes at least one switching device, in particular a fast switching device, for example, an insulated gate bipolar transistor (IGBT), a gate turn-off thyristor (GTO), or a silicon-controlled rectifier, in series with a resistive device. Once activated, the switching device transmits electric current to the resistive device to be dissipated as heat energy. The protection element may also be referred to as "dynamic braking circuit" or "chopper". Other circuits that enable a similar operation, or a combination thereof may also be conceivable and expressly fall under the scope of the protection element.

In an embodiment according to the first aspect, the obtained information is indicative of a grid voltage drop or DFIG overpower.

In an embodiment according to the first aspect, the obtained information is indicative of at least one of a measured voltage level at a grid connection point of the DFIG, that is, a point of connection of the DFIG to the grid, a rated voltage level of the grid connection point, a difference of the measured voltage level and the rated voltage level, a measured power supplied to the grid, a steady state active power supplied to the grid, and a difference of the measured power and the steady state active power.

In an embodiment according to the first aspect, the target power value and/or the predetermined threshold is, for example, preset in a controller of the wind turbine, obtained together with the information, or indicated through further parameters obtained, for example, from the grid or grid operator. For example, the target power value and/or the predetermined threshold may represent grid connection regulations.

In an embodiment according to the first aspect, the information represents a grid fault. As used herein, the term "fault" generally refers to any of the following events at the grid including impulses, notches, glitches, interruptions, voltage sag/swells, harmonic distortions, and flickers.

In an embodiment according to the first aspect, the information represents a grid connection interruption.

In the event of grid faults, and in particular a grid connection interruption in weak grids/at weak grid connection points, the power supplied by the generator to the grid may exceed the target power value beyond the predetermined threshold. To compensate for an amount of power that cannot be fed to the grid, a drive train of the DFIG wind turbine may either take up mechanical loads so as to reduce excessive electrical power provided by the generator or by dissipating the excessive electrical power provided by the generator at the protection element. Advantageously, controlling the converter in the event of a grid fault in the above described manner and hence increased capacity of power dissipation may contribute to reduce a mechanical load acting on the drive train of such DFIG wind turbines. Additionally or alternatively, drive train configuration requirements with regard to the ability to withstand such loads may be lowered, thereby contributing to reduce the overall costs of a DFIG wind turbine.

In an embodiment according to the first aspect, the protection element is configured to dissipate a predetermined portion, for example, at least ⅔, of the DFIG wind turbine's rated power. For example, if the DFIG wind turbine has a rated power of 6 MW, both the machine-side inverter and the grid-side inverter have a rated power of at least 2 MW and the protection element is configured to withstand and dissipate at least 4 MW. The skilled person will appreciate that the load energy capability of the protection element depends on a number of configuration criteria, including the rated speed, grid code requirements, cooling capacity, et cetera.

In an embodiment according to the first aspect, the information further indicates a weak grid connection point. In the present disclosure, a weak grid connection point is understood as a grid connection point with a short circuit ratio, SCR, at the point of connection below a specific value, for example with SCR<3, in particular SCR<2, and more particularly SCR<1.5.

In an embodiment according to the first aspect, the grid-side inverter is configured to be controlled based on a set point value representative of a voltage level of the DC voltage intermediate circuit.

Furthermore, the protection element is configured to be controlled based on a threshold value representative of a maximum voltage level of the DC voltage intermediate circuit.

Controlling the converter, in response to obtaining the information, includes adapting the set point value and/or the threshold value such that the set point value is above the threshold value, that is, adapting at least one of the set point value and the threshold value.

By adapting, the converter is enabled to draw a controlled amount of active power from the grid-side AC bus into the DC voltage intermediate circuit and particularly towards the protection element. For example, given a set point value of 1100 V, the threshold value may be set to 1200 V or 1300 V.

In an embodiment according to the first aspect, adapting the set point value and/or the threshold value such that the set point value is above the threshold value specifically includes increasing the set point value.

In an embodiment according to the first aspect, adapting the set point value and/or the threshold value such that the set point value is above the threshold value specifically includes decreasing the threshold value.

In an embodiment according to the first aspect, the protection element is configured to be activated and deactivated based on a duty cycle value.

Furthermore, the controlling the converter, in response to obtaining the information, includes:

- obtaining a first parameter representative of a voltage level of the DC voltage intermediate circuit; and
- determining, based on the first parameter, the duty cycle value such that the protection element dissipates a predetermined amount of power from the DC voltage intermediate circuit.

The first parameter may be a measured voltage level of the DC voltage intermediate circuit. For example, the first parameter may be obtained in the step of obtaining the information.

The duty cycle value may represent a pulse active time signal for activating and deactivating the protection element. By increasing the pulse active time, the amount of power dissipated at the protection element can be increased.

In an embodiment according to the first aspect, the duty cycle value is determined based on a voltage level difference between the first parameter and the set point value. Advantageously, the duty cycle value is increased at higher voltage level differences and decreased at lower voltage level differences so as to control the amount of power dissipated from the DC voltage intermediate circuit. In particular, changing the duty cycle value may compensate for the adapted set point value and/or threshold value, for example, in the event of a higher set point value, a higher duty cycle value may be useful to faster dissipate the accumulated power in the DC voltage intermediate circuit.

In an embodiment according to the first aspect, the duty cycle value is determined based on the voltage level difference by applying a characteristic. The characteristic can be, for example, a non-linear curve or a droop. In particular, the characteristic is predetermined. For example, the characteristic may be preset in a controller of the wind turbine.

In an embodiment according to the first aspect, the characteristic is predetermined based on a short circuit ratio, SCR, value at the grid connection point of the DFIG, a characteristic value of the protection element and a rated voltage level of the DC voltage intermediate circuit. In particular, based on the characteristic value of the protection element, and in particular its ohmic resistance, the characteristic can account for the amount of power that can be dissipated at the protection element. Furthermore, in particular based on the SCR value of the grid connection point, the characteristic can account for the amount of power that can be supplied to the electric grid. Advantageously, for every operating point of a given DFIG wind turbine connected to the grid, a proper duty cycle value can be determined.

In an embodiment according to the first aspect, adapting the set point value and/or the threshold value such that the set point value is above the threshold value includes:

- obtaining a second parameter representative of at least one of a voltage level at the grid connection point and power supplied by the generator to the grid; and
- determining, based on the second parameter, the set point value such that the grid-side inverter supplies a predetermined amount of power to the protection element.

The second parameter may include a measured voltage level at the grid connection point. For example, the second parameter may be obtained in the step of obtaining the information.

In particular, based on the second parameter, adapting the set point value and/or the threshold value such that the set point value is above the threshold value in an embodiment according to the first aspect specifically includes:

- determining, based on the second parameter, an event of a grid voltage sag and/or generator overpower; and determining, in response to the determined event, the set point value based on the second parameter such that the grid-side inverter supplies a predetermined amount of power to the protection element.

The predetermined amount of power to be supplied to the protection element may particularly compensate an amount of generator overpower and/or an amount of power that cannot or no longer be fed to the grid.

In an embodiment according to the first aspect, the target power value encompasses a target power output for drive train oscillation damping.

Furthermore, determining the set point value such that the grid-side inverter supplies a predetermined amount of power to the protection element includes determining the set point value based on the target power value.

Advantageously, the set point value may be determined such that the protection element implements a function of damping oscillations of the drive train of the DFIG wind turbine. In particular, the grid-side inverter may supply a predetermined amount of power that accounts for mechanical loads acting on the drive train. Additionally or alternatively, drive train configuration requirements with regard to the ability to withstand such loads may be lowered, thereby contributing to reduce the overall costs of a DFIG wind turbine.

According to a second aspect, a method for controlling a converter is specified. Features described in the context of the first aspect apply to the second aspect and vice versa.

Specifically, the converter is configured to be connected to a rotor of a doubly-fed induction generator for feeding electrical power into an electrical grid. The converter includes a machine-side inverter, a grid-side inverter, and a DC voltage intermediate circuit. The DC voltage intermediate circuit contains a protection element for dissipating power from the DC voltage intermediate circuit. The method includes the steps of:

(1) obtaining information representative of a target power output for drive train oscillation damping; and (2) controlling, based on the information, the converter such that the grid-side inverter supplies power to the protection element so as to dissipate power from the DC voltage intermediate circuit.

Advantageously, the converter may be controlled such that the protection element implements a function of damping oscillations of the drive train of the DFIG wind turbine. In particular, the grid-side inverter may supply a predetermined amount of power that accounts for mechanical loads acting on the drive train. Additionally or alternatively, drive train configuration requirements with regard to the ability to withstand such loads may be lowered, thereby contributing to reduce the overall costs of a DFIG wind turbine.

According to a third aspect, an apparatus for controlling a converter is specified. Features described in the context of the first or the second aspects apply to the third aspect and vice versa.

Specifically, the converter is configured to be connected to a rotor of a doubly-fed induction generator for feeding electrical power into an electrical grid. The converter includes a machine-side inverter, a grid-side inverter, and a DC voltage intermediate circuit. The DC voltage intermediate circuit contains a protection element for dissipating power from the DC voltage intermediate circuit. The apparatus is configured to perform the steps of the method according to either of the first or second aspect.

According to a fourth aspect, a system is specified. Features described in the context of the first, the second or the third aspects apply to the fourth aspect and vice versa.

Specifically, the system includes a wind turbine, a doubly-fed induction generator, a converter and an apparatus according to the third aspect for controlling the converter. The generator includes a rotor and a stator. The converter includes a machine-side inverter connected to the rotor, a grid-side inverter, and a DC voltage intermediate circuit. The DC voltage intermediate circuit contains a protection element for dissipating power from the DC voltage intermediate circuit. The stator and the grid-side inverter are configured to be connected to an electrical grid for feeding electrical power into the electrical grid.

BRIEF DESCRIPTION OF DRAWINGS

The invention will now be described with reference to the drawings wherein.

DETAILED DESCRIPTION

Elements of the same construction or function are marked with the same reference signs across the figures.

Figure 1:
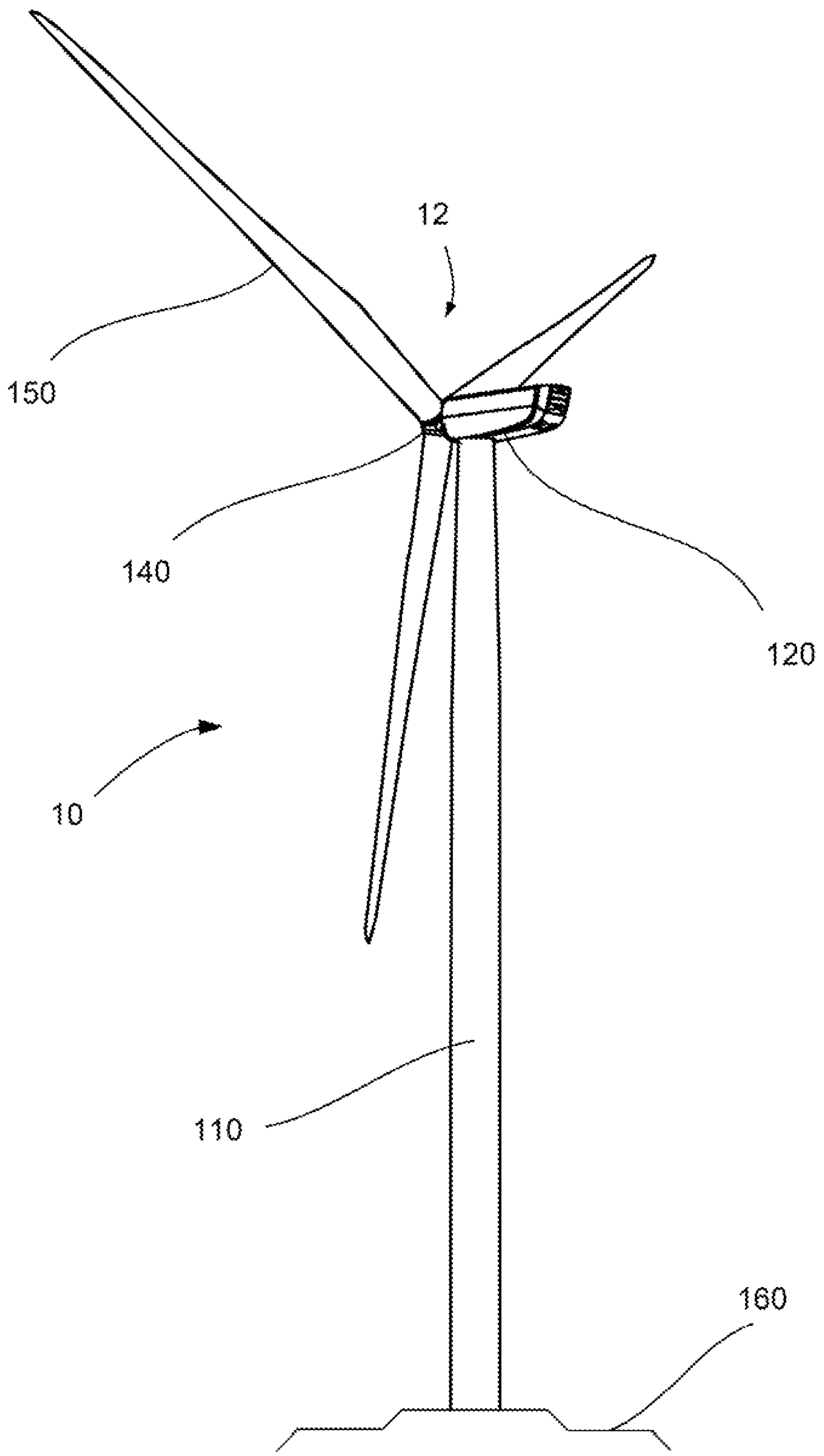
FIG. 1 shows a schematic view of a wind turbine.

FIG. 1 shows a schematic view of a wind turbine 10, which includes a tower 110. The tower 110 is fixed to the ground via a foundation 160. At one end of the tower 110 opposite to the ground a nacelle 120 is rotatably mounted. The nacelle 120, for example, includes a generator 15 (see FIG. 2) which is coupled to a rotor 12 via a rotor shaft (not shown). The rotor 12 includes one or more (wind turbine) rotor blades 150, which are arranged on a rotor hub 140.

During operation, the rotor 12 is set in rotation by an air flow, for example wind. This rotational movement is transmitted to the generator 15 via the rotor shaft and, if necessary, a gearbox. The generator 15 converts the mechanical energy of the rotor 12 into electrical energy.

Figure 2:
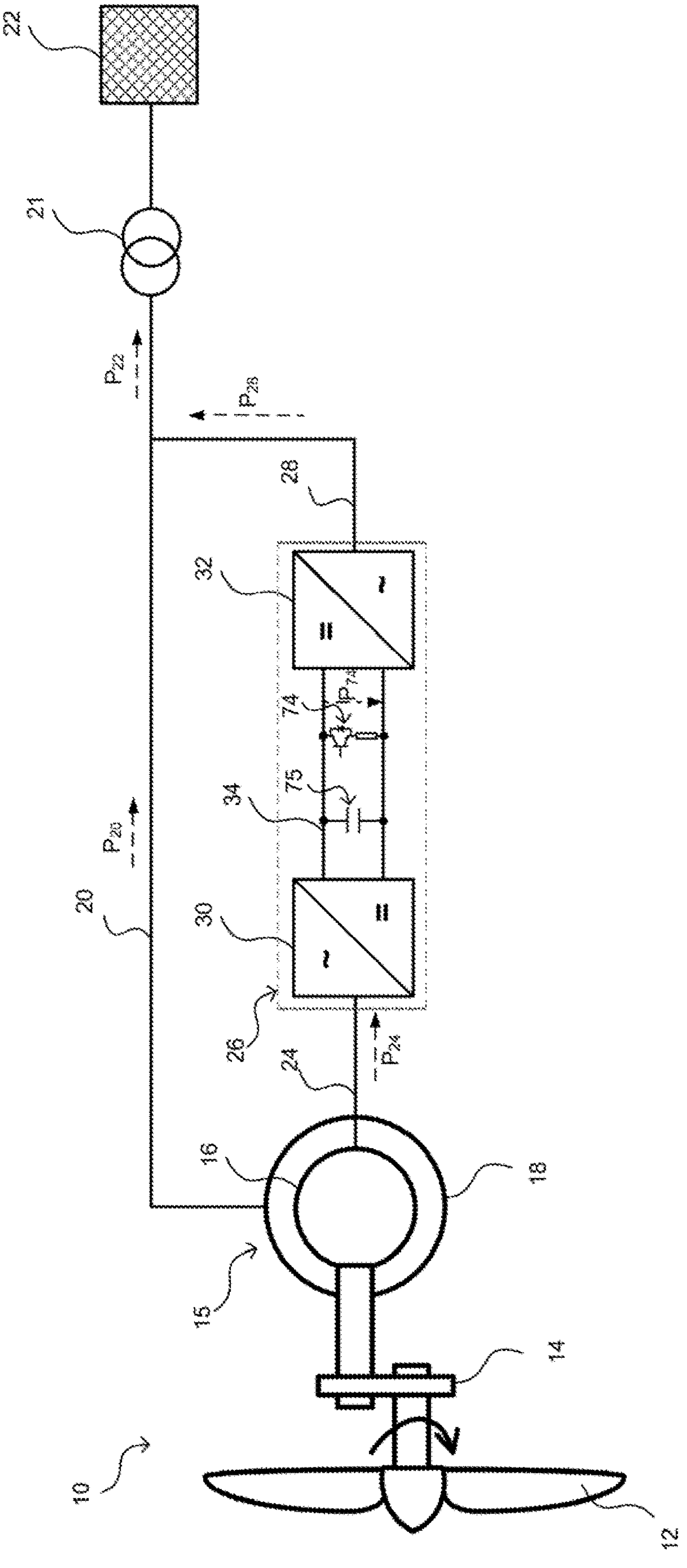
FIG. 2 shows a schematic diagram of the wind turbine of FIG. 1 connected to an electrical grid.

FIG. 2 shows a schematic diagram of the wind turbine 10 connected to an electrical grid 22. The rotor 12 of the wind turbine 10 takes up a torque from the wind and transfers this torque via the drive train 14, which may include a gearbox, to the rotor 16 of the generator 15. The generator 15 of FIG. 2 is configured to convert the kinetic energy taken up by the rotor 12 into electrical energy and to feed this into the three-phase electrical grid 22. The stator 18 of the generator 15 is connected to the three-phase electrical grid 22 via a three-phase connection 20 and a transformer 21. The rotor 16 of the generator 15 is connected to the converter 26 via a three-phase connection 24. The grid side of the converter 26 is connected to the three-phase connection 20 and to the electrical grid 22 via a three-phase connection 28. This configuration is also known as DFIG (doubly-fed induction generator). Via the converter 26, it is possible to decouple a speed of rotation of the rotor 12 from an electrical frequency of the electrical grid 22 while the stator 18 is rigidly connected to the electrical grid 22. For a better overview, only one line is shown for each three-phase electrical connection.

The converter 26 helps to ensure supply of active and reactive current, for example, in the event of grid faults, and thus compliance with specific grid connection regulations. The converter 26 includes a machine-side inverter (also referred to as rotor-side or generator-side inverter) 30 and a grid-side inverter (also referred to as line-side inverter) 32. Both are connected by a DC voltage intermediate circuit (also referred to as DC link) 34. The DC link 34 includes a protection element (also referred to as chopper) 74 and may further include a capacitive device 75 for maintaining the DC link voltage at a certain level, both coupled between a positive DC bus and a negative DC bus of DC link 34. The chopper 74 may include or substantially consist of a switch coupled in series with a resistor, where the switch may be any device for switching including, without limitation, a GTO or an IGBT. In operation, the switch controllably couples the positive and negative DC bus to the resistor to convert excess energy into heat, for example, in the event of grid faults when it can no longer be fed into the electric grid 22 due to a low grid voltage.

Figure 3:
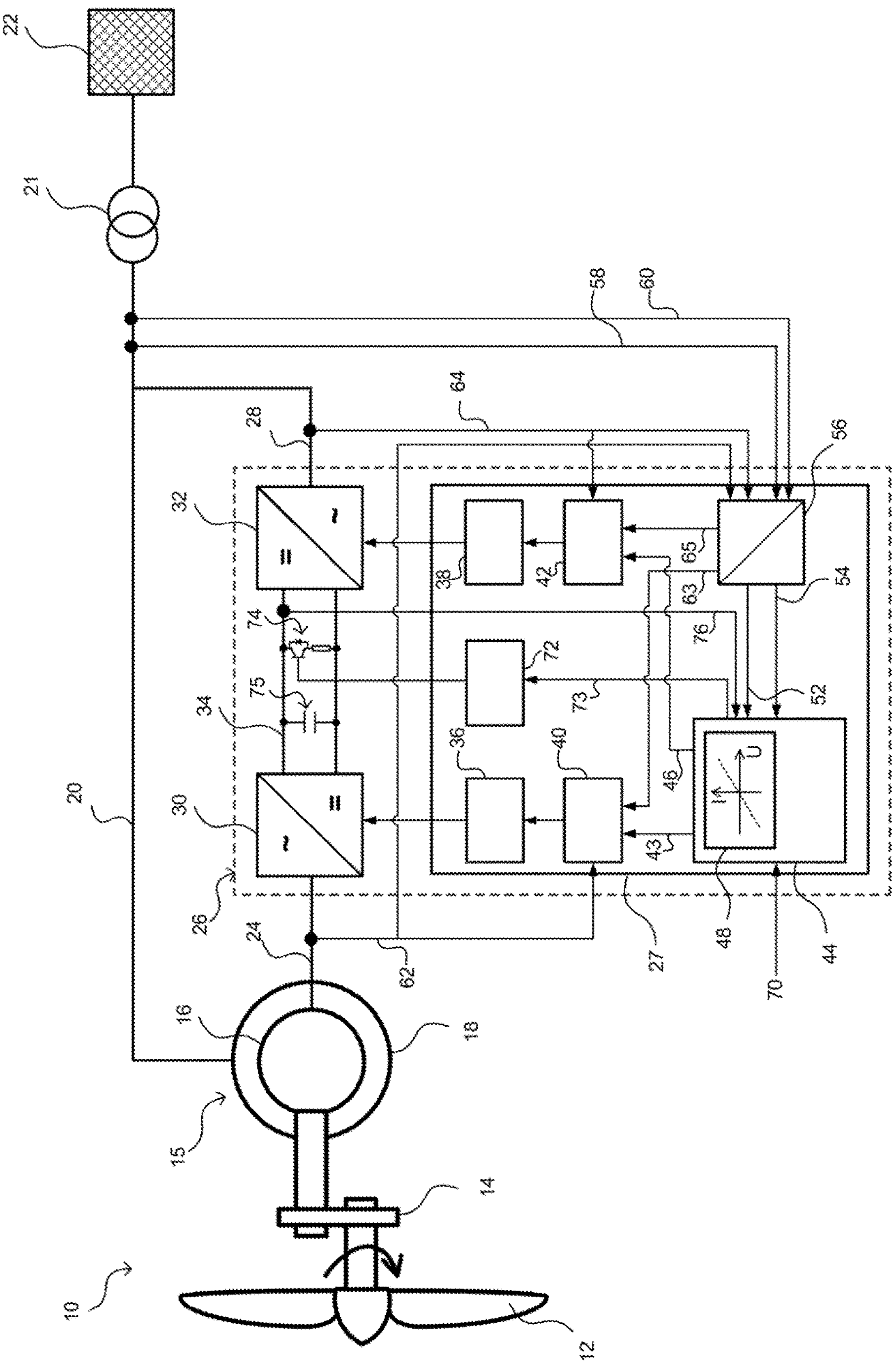
FIG. 3 shows a detail view of the diagram of FIG. 2.

FIG. 3 shows another schematic view of the wind turbine 10 with additional elements of the converter 26. The converter 26 has a controller 27 configured to control the operation of the inverters 30, 32 and chopper 74, for example, depending on various input variables 58, 60, 62, 64, 70, 76, parameters and/or characteristic curves present at or stored in the controller 27. The controller 27 is particularly configured to control the converter 26 in accordance with a method of the present disclosure.

For illustration, a number of elements useful to implement the method of this disclosure are depicted in FIG. 3. These elements may be implemented as software modules of a control software or as separate devices, which are configured to follow the steps of the method, or as a combination thereof. Nothing herein, however, should be interpreted to limit the scope of the disclosure to the specific illustration of FIG. 3, this representing merely an example discussed to highlight certain aspects of the present disclosure.

For better overview, a controller that controls the operation of the wind turbine is not shown. However, it is conceivable that parts of the method of this disclosure can be implemented in such a controller and that, by way of example, a set point value for an electrical variable in dependence on the grid voltage may be determined by such a controller. It is also conceivable to implement a method of this disclosure in whole or in part by analogue means.

The inverters 30, 32 may be controlled by current controllers 40, 42 and pulse-width modulators 36, 38. More specifically, the current controller 40 may control the pulse-width modulator 36, which in turn may provide the pulse width modulation for the rotor-side inverter 30, and the current controller 42 may control the pulse-width modulator 38, which in turn may provide the pulse-width modulation for the grid-side inverter 32. The chopper 74 may be controlled by pulse-width modulator 72. More specifically, a measured DC link voltage 76 may be present at, for example, set point module 44. The set point module 44 may be particularly configured to determine a set point value 73 for controlling the pulse-width modulator 72, that is, for setting a duty cycle of the chopper 74 and/or setting a threshold for activating the chopper 74.

Set point values 43, 46 and actual values 63, 65 for controlling the rotor-side inverter 30 and the grid-side inverter 32 may be present at the current controllers 40, 42. The set point values 43, 46 may be determined by the set point module 44. Measured values 62, 64 for the currents on the rotor side and on the grid side may also be present at the current controllers 40, 42, as shown in FIG. 3.

Measured voltages 58 and measured currents 60 from the three-phase connection 20 to the grid 22 may be present at the controller 27. Furthermore, the measured currents 62 measured in the three-phase connection circuit 24 between the rotor 16 of the generator 15 and the rotor-side inverter 30 and the measured currents 64 measured in the three-phase connection circuit 28 of the grid-side inverter 32 may be present as input quantities at the converter controller 27. The currents 62 measured in the three-phase connection 20 of the rotor-side inverter 30 to the rotor 16 may also be present at the current controller 40 that controls the pulse-width modulator 36 and thus the rotor-side inverter 30. Accordingly, the currents 64 measured in the three-phase connection 28 of the grid-side inverter 32 may also be present at the current controller 42 that controls the pulse-width modulator 38 and thus the grid-side inverter 32. This way it is possible to control the frequency of the pulse-width modulation depending on the currents.

The plural used for the measured quantities 58, 60, 62, 64 is due to the fact that they may be measured and processed in a multi-phase system. For example, in case of the measured voltage 58 there may be voltage measurements for all three phases of the three-phase connection 20 present at the controller 27. Alternatively, for a three-phase system, without a neutral conductor, there may be only two measurements from two phases and the value of the third phase may be calculated.

The input quantities 58, 60, 62, 64 present at the converter controller 27 may be measured by suitable sensors that capture the relevant quantities at the three-phase connections 20, 24, 28 and forward them to the controller 27 as input values. Large dots represent these sensors in FIG. 3. The sensors may preferably be contactless. Apart from the measurements shown in FIG. 3, there may be other measurements that allow conclusions to be drawn about the input quantities. It is also conceivable that input quantities are obtained by estimation or other ways of observation. Other input quantities 70 may be present at the controller 27.

The controller 27 in the embodiment shown in FIG. 3 has a transformation module 56, which is configured to transform the three-phase input quantities 58, 60, 62, 64 into a positive sequence system and a negative sequence system. The transformation module 56 therefore may provide actual values 52, 54, 63, 65 for the voltages and currents in the positive and negative sequence systems to the set point module 44 and to the current controllers 40, 42. The set point module 44 may be configured to provide set point values 43, 46 to the current controllers 40, 42. For example, the set point module 44 may have a characteristic curve 48, which it may use to determine a set point for a reactive current to be fed into the grid based on an actual voltage in the negative sequence system. The set point module 44 and/or the current controllers 40, 42 may further be configured to detect a grid fault based on the actual values of the grid voltage. For example, an asymmetric grid fault is detected from the voltage in the negative sequence system.

In comparison to converters that also decouple the generator 15 from the electrical grid 22 on the stator side ("full converter"), which converters usually can convert the full power of the wind turbine 10 into heat for a certain time with the help of a chopper, a current carrying capacity of converters 26 in a DFIG configuration ("partial converter") is often limited such that only about a third of their rated power is routed through the converter 26 and can thus be diverted to the chopper 74. Specifically, with reference to FIG. 2, for example in the event of a detected grid fault with the stator 18 being rigidly coupled to the faulty electrical grid 22, only the rotor-side inverter 30 would supply power $P_{74}$ to the chopper 74; for power $P_{22}$ supplied to the faulty electrical grid 22 thus the following applies:

$$P_{22}=P_{20}+P_{24}-P_{74},$$

where $P_{20}$ denotes power supplied over three-phase connection 20, $P_{22}$ denotes power supplied to the faulty electrical grid 22, $P_{24}$ denotes power supplied over three-phase connection 24, $P_{28}$ denotes power supplied over three-phase connection 28, and $P_{74}$ denotes power dissipated at the chopper 74 with $$P_{74}=P_{24}-P_{28}$$

and $$P_{22}=P_{20}+P_{28}.$$

In addition, the inventor realized that in the above mentioned event the controlling of the chopper 74 as well as the converter 26 may lead to a current limitation of the machine-side inverter 30 where the available capacity of the converter 26 cannot be used for the chopper 74.

Figure 4:
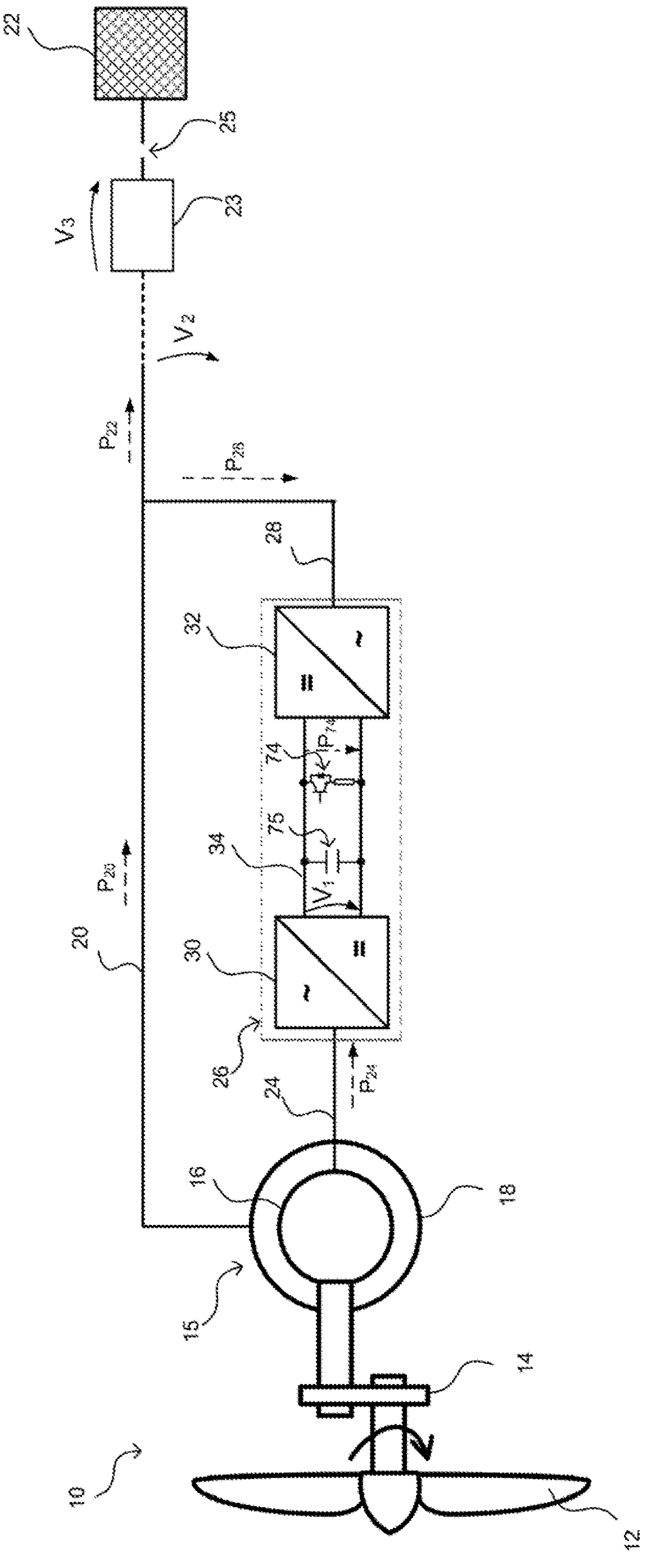
FIG. 4 shows another schematic diagram of the wind turbine of FIG. 1 connected to an electrical grid.

FIG. 4 illustrates one aspect of the present disclosure, where for better overview, sensors, the transformer and further elements as explained in FIG. 3 are not shown; the skilled person however will appreciate that the following description likewise applies to the subject-matter of FIG. 3. According to the aspect illustrated in FIG. 4, in addition to the rotor-side inverter 30, the grid-side inverter 32 is controlled to also dissipate power to the chopper 74 in the DC link 34 of the converter 26. Particularly, power P28 is transferred from the stator 18 to the grid-side inverter 32 via (parts of) the electrical grid 22. Such transfer requires a remaining AC voltage (V2 in FIG. 4) at the stator 18 even in case of grid faults (indicated in FIG. 4 through broken line at reference numeral 25). The inventor has realized that this is particularly the case at weak grid connection points, that is, at connection points with a short circuit ratio, SCR, lower than 3, since a voltage drop (V3 in FIG. 4) across grid impedance 23 up to the grid fault 25 results in voltage V2 at the wind turbine 10, that is, a voltage at the grid connection point.

In case of a deep voltage sag, the converter 26 is controlled to create an island network up to a location of the grid fault 25. Depending on the impressed reactive current as well as the impedance 23 up to the location of the grid fault 25, the voltage $V_2$ at the wind turbine 10 may remain at up to 50% of the nominal voltage even in the case of a low-impedance "hard" 3-phase fault. Thus, an energy transport from the stator 18 into the chopper 74 could take place via the island network at the stator 18 which the wind turbine 10 generates through reactive current.

According to a first implementation manner of the present disclosure, power can be supplied to the chopper 74 via the grid-side inverter 32 by adapting a set point value 83 of the voltage of the DC link 34 of the grid-side inverter 32. Specifically, the set point value 83 is adapted such that it is greater than a threshold for the activation of the chopper 74, that is, a threshold for the switch to couple the positive and negative DC bus to the resistor.

Figure 5:
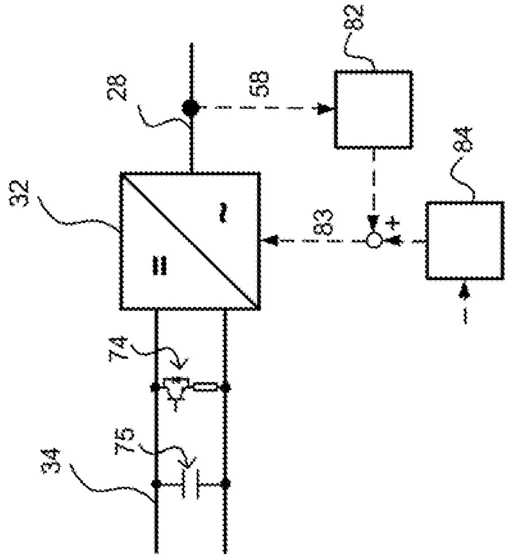
FIG. 5 shows a detail section of the diagram of FIG. 4.

For example, with reference to FIG. 5, the set point value 83 for the voltage of the DC link 34 at the grid-side inverter 32 can be adjusted using a droop 82 in such a way that a defined amount of power can be drawn into the chopper 74 via the grid-side inverter 32 depending on the measured AC voltage 58 ($V_2$) at the grid connection point and the power $P_{22}$ that is fed to the grid 22 by the wind turbine 10.

Additionally or alternatively, as indicated in FIG. 5, the set point value 83 may be further determined based on an obtained target value for drive train oscillation damping so as to implement a function 84 of damping oscillations of the drive train 14 of the DFIG wind turbine 10 using the chopper 74. In conventional algorithms for drive train oscillation damping for DFIG wind turbines, power is delivered to the grid 22 in an oscillating manner. However, if the permitted oscillating power output is limited by grid connection conditions, by changing the DC link voltage set point value 83, the power output required for drive train damping can be supplied to the chopper 74 with the aid of the grid-side inverter 32, thus minimizing oscillating power being supplied to the grid 22. Function 84 may in this respect for example obtain a target power value or other parameters indicative of a desired amount of power to be dissipated at the chopper 74 so as to determine the DC link voltage set point value 83 accordingly. Notably, drive train oscillation damping through the chopper 74 may be implemented independent of capability of the grid 22, so as to, for example, comply with grid regulations.

Figure 6:
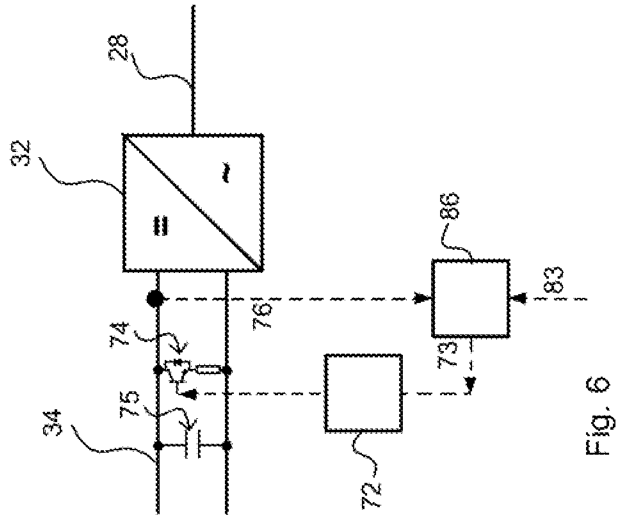
FIG. 6 shows another detail section of the diagram of FIG. 4.

Additionally or alternatively, a duty cycle for controlling the chopper 74 can be adapted based on the voltage of DC link 34. For example, the pulse-width modulator 72 (cf. FIG. 3, not shown in FIG. 5) may receive the set point value 83 and compare it with the measured DC link voltage 76, or may receive a comparison result, for example, a difference, based on which a duty cycle of the chopper 74 can be determined. Specifically, with reference to FIG. 6, based on a voltage level difference between the measured DC link voltage 76 ($V_1$) and the DC link voltage set point value 83, a set point value 73 for controlling the pulse-width modulator 72 may be set using a droop 86. For better intelligibility, the term "duty cycle value" may be used throughout this disclosure instead of expression "set point value 73 for controlling the pulse-width modulator 72". By knowledge of the droop 86, the set point value 83 of the DC link 34 at the grid-side inverter 32 can be adjusted (cf. FIG. 5) using the droop 82 in such a way that a defined amount of power can be drawn into the chopper 74 via the grid-side inverter 32 depending on the grid voltage 58 ($V_2$).

According to a second implementation manner of the present disclosure, power can be supplied to the chopper 74 via the grid-side inverter 32 by adapting a threshold value for activating the chopper 74, for example, as an alternative or in addition to the first implementation manner. Specifically, the threshold is adapted such that it is lower than the set point. Both implementation manners enable, among others, a controlled amount of power being drawn into the chopper 74 as well as the controlled sharing of power being drawn into the chopper 74 between the grid-side inverter 32 and the machine-side inverter 30.

Figure 7:
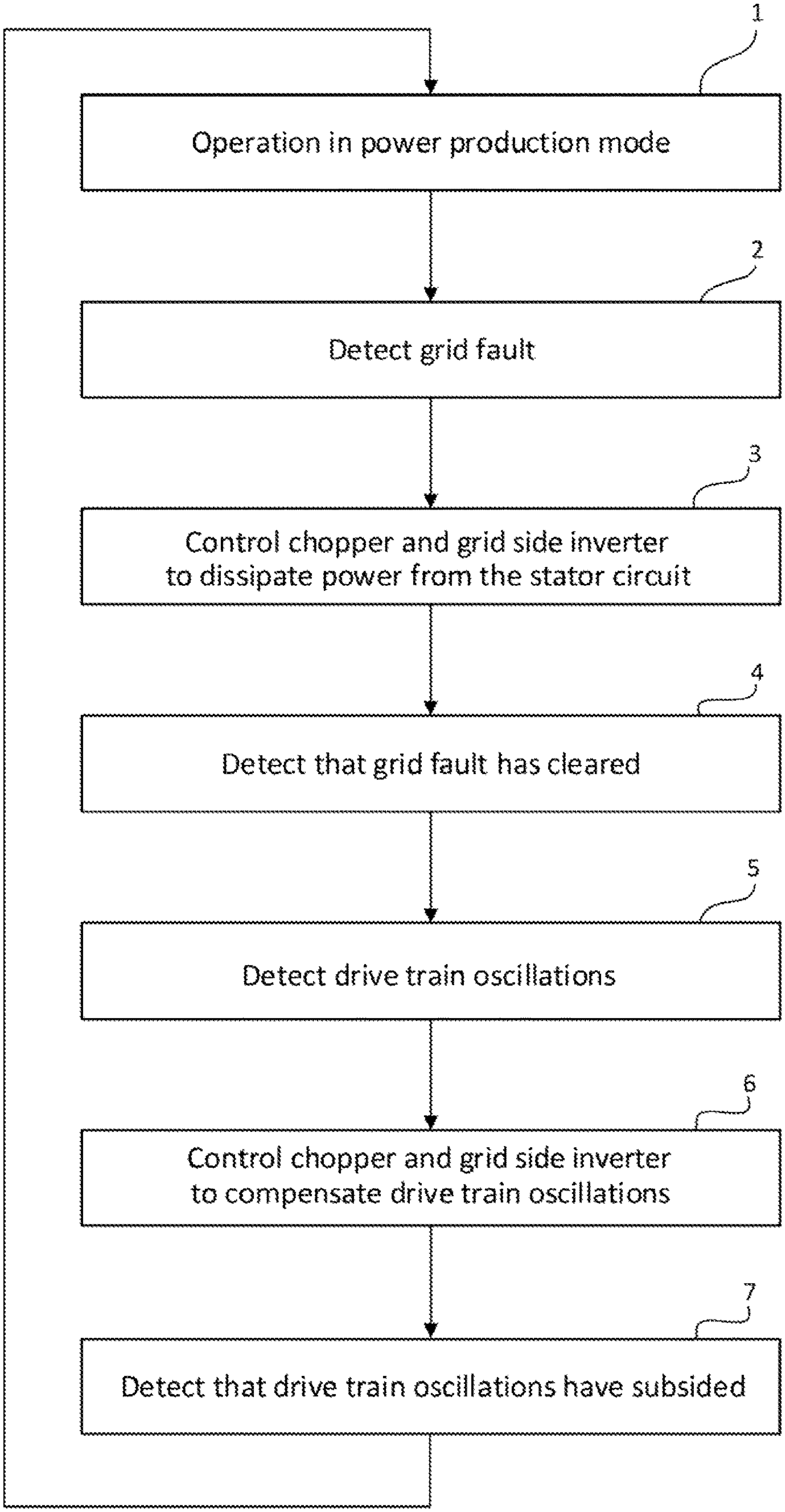
FIG. 7 shows a schematic flow diagram of a method of controlling a wind turbine.

FIG. 7 shows a schematic flow diagram of a method of controlling the wind turbine 10.

In a step 1, the DFIG 15 and the converter 26 are operated in a power production mode, that is, the converter 26 is controlled to output power $P_{28}$ to the grid 22. The converter

26 may particularly ensure supply of active and reactive current in compliance with specific grid requirements. When a grid fault is detected (step 2), for example, by a voltage drop in measured voltage 58, the converter 26 is controlled in accordance with the first or second implementation manner described above (step 3) so as to draw power $P_{28}$ at least partially into the DC link 34 and dissipate power $P_{74}$ with the aid of the chopper 74. In this respect the threshold and/or duty cycle of the chopper 74 and/or the set point value 83 of the grid-side inverter 32 are adapted. Once the grid fault has been detected to have cleared (step 4), the converter 26 may return to being operated again in power production mode (step 1). In the example shown in FIG. 7, the converter 26 may be operated to compensate drive train oscillations (steps 5, 6). Specifically, based on oscillations at the drive train 14 being detected, for example, oscillations exceeding a defined magnitude, the converter 26 may be controlled to draw an oscillating amount of power $P_{28}$ into the DC link 34 and dissipate power $P_{74}$ with the aid of the chopper 74. In this respect the threshold and/or duty cycle of the chopper 74 and/or the DC link voltage set point value 83 of the grid-side inverter 32 are adapted. Once the drive train oscillations have been detected to have subsided (step 7), the converter 26 is operated again in power production mode (step 1).

It shall be pointed out that the above described flow diagram is merely exemplary and that particularly the order of steps could vary in practice as can be readily understood by a person skilled in the art. Furthermore, drive train oscillation compensation can be performed independent of a detected grid fault, that is, both during power production mode and during the grid fault.

The use of the grid-side inverter 32 according to the present disclosure for drawing power into the chopper 74 enables a larger power dissipating capacity of DFIG wind turbines and may particularly double the capacity of DFIG wind turbines to dissipate power depending on the fault type. Due to the rapidly growing expansion of wind energy with only moderate growth in grid expansion, wind farms with weak grid connection points are increasingly being created. As a result, only a small part of the rated power of such a wind farm can be absorbed by the grid, especially in the event of grid faults. As a result, DFIG wind turbines in particular have to withstand greater loads on the drive train, since the generator stator is rigidly coupled to the faulty grid and the chopper is limited in power consumption by the partial converter.

This may particularly lead to strong torque fluctuations at the generator 15 and thus to an increasing load on the drive train 14, which must be taken into account in the configuration of wind turbines 10 for DFIG configuration. Accordingly, via a method according to the present disclosure, DFIG wind turbines may be used even on weak grids where a power absorption capability of the grid is limited, especially in the event of a grid fault. Furthermore, the load on the mechanical drive train 14 of such DFIG wind turbines particularly in the event of a grid fault can be reduced. Likewise, a reduction of mechanical drive train configuration requirements with a simultaneously larger chopper can reduce the overall costs of the DFIG wind turbine.

It is understood that the foregoing description is that of the preferred embodiments of the invention and that various changes and modifications may be made thereto without departing from the spirit and scope of the invention as defined in the appended claims.

The invention claimed is:

1. A method for controlling a converter, wherein the converter is configured to be connected to a rotor of a doubly-fed induction generator for feeding electrical power into an electrical grid, the converter including a machine-side inverter, a grid-side inverter, and a DC voltage intermediate circuit having a protection element for dissipating power from the DC voltage intermediate circuit, the method comprising:

obtaining information representative of the electrical power supplied by the generator to the electrical grid exceeding a target power value beyond a predetermined threshold; and controlling the converter based on a set point value representative of a voltage level of the DC voltage intermediate circuit in response to obtaining said information, such that the grid-side inverter draws power from a grid-side AC bus and supplies said power from the grid-side AC bus to the protection element so as to dissipate power from the DC voltage intermediate circuit and so increase power dissipation for the doubly-fed induction generator; wherein:

the grid-side inverter is configured to be controlled based on the set point value representative of the voltage level of the DC voltage intermediate circuit;

the protection element is configured to be controlled based on a threshold value representative of a maximum voltage level of the DC voltage intermediate circuit; and, said controlling the converter in response to obtaining said information includes adapting at least one of the set point value and the threshold value such that the set point value is above the threshold value.

2. The method of claim 1, wherein said information represents a grid fault.

3. The method of claim 1, wherein said information represents a grid connection interruption.

4. The method of claim 1, wherein said information further indicates a weak grid connection point.

5. The method of claim 1, wherein said adapting at least one of the set point value and the threshold value such that the set point value is above the threshold value includes increasing the set point value.

6. The method of claim 1, wherein said adapting at least one of the set point value and the threshold value such that the set point value is above the threshold value includes decreasing the threshold value.

7. The method of claim 1, wherein the protection element is configured to be activated and deactivated based on a duty cycle value; and, said controlling the converter in response to obtaining said information includes:

obtaining a first parameter representative of a voltage level of the DC voltage intermediate circuit; and, determining, based on the first parameter, the duty cycle value such that the protection element dissipates a predetermined amount of power from the DC voltage intermediate circuit.

8. The method of claim 7, wherein the duty cycle value is determined based on a voltage level difference between the first parameter and the set point value by applying a characteristic.

9. The method of claim 8, wherein the characteristic is predetermined based on a short circuit ratio value at the grid connection point of the generator, a characteristic value of the protection element, and a rated voltage level of the DC voltage intermediate circuit.

10. The method of claim 1, wherein said adapting at least one of the set point value and the threshold value such that the set point value is above the threshold value includes:

obtaining a second parameter representative of at least one of a voltage level at the grid connection point and the electrical power supplied by the generator to the grid; and, determining, based on the second parameter, the set point value such that the grid-side inverter supplies a predetermined amount of power to the protection element.

11. The method of claim 1, wherein the target power value encompasses a target power output for drive train oscillation damping; and said determining the set point value such that the grid-side inverter supplies a predetermined amount of power to the protection element includes:

determining the set point value based on the target power value.

12. A method for controlling a converter, wherein the converter is configured to be connected to a rotor of a doubly-fed induction generator for feeding electrical power into an electrical grid, the converter including a machine-side inverter, a grid-side inverter, and a DC voltage intermediate circuit including a protection element for dissipating power from the DC voltage intermediate circuit, the method comprising:

obtaining information representative of a target power output for drive train oscillation damping; and, controlling the converter based on the obtained information and on a set point value representative of a voltage level of the DC voltage intermediate circuit, such that the grid-side inverter draws power from a grid-side AC bus and supplies said power from the grid-side AC bus to the protection element so as to dissipate power from the DC voltage intermediate circuit;

wherein:

the grid-side inverter is configured to be controlled based on the set point value representative of the voltage level of the DC voltage intermediate circuit;

the protection element is configured to be controlled based on a threshold value representative of a maximum voltage level of the DC voltage intermediate circuit; and, said controlling the converter in response to obtaining said information includes adapting at least one of the set point value and the threshold value such that the set point value is above the threshold value.

13. An apparatus for controlling a converter, wherein the converter is configured to be connected to a rotor of a doubly-fed induction generator for feeding electrical power into an electrical grid, the converter including a machine-side inverter, a grid-side inverter, and a DC voltage intermediate circuit having a protection element for dissipating power from the DC voltage intermediate circuit, and the apparatus being configured to obtain information representative of the electrical power supplied by the generator to the electrical grid exceeding a target power value beyond a predetermined threshold; and to control the converter based on a set point value representative of a voltage level of the DC voltage intermediate circuit in response to obtaining said information, such that the grid-side inverter draws power from a grid-side AC bus and supplies said power from the grid-side AC bus to the protection element so as to dissipate power from the DC voltage intermediate circuit and so increase power dissipation for the doubly-fed induction generator;

wherein:

the grid-side inverter is configured to be controlled based on the set point value representative of the voltage level of the DC voltage intermediate circuit;

the protection element is configured to be controlled based on a threshold value representative of a maximum voltage level of the DC voltage intermediate circuit; and said controlling the converter in response to obtaining said information includes adapting at least one of the set point value and the threshold value such that the set point value is above the threshold value.

14. A system comprising a wind turbine, the doubly-fed induction generator, the converter and the apparatus for controlling the converter of claim 13, the generator including the rotor and a stator, the converter including the machine-side inverter connected to the rotor, the grid-side inverter, and the DC voltage intermediate circuit including the protection element for dissipating power from the DC voltage intermediate circuit, wherein the stator and the grid-side inverter are configured to be connected to the electrical grid for feeding electrical power into the electrical grid.

* * * * *